Nov. 9, 1948.  W. A. BLUME ET AL  2,453,188
METHOD OF MAKING FRICTION ELEMENTS AND BOND THEREFOR
Filed June 28, 1943  5 Sheets-Sheet 1
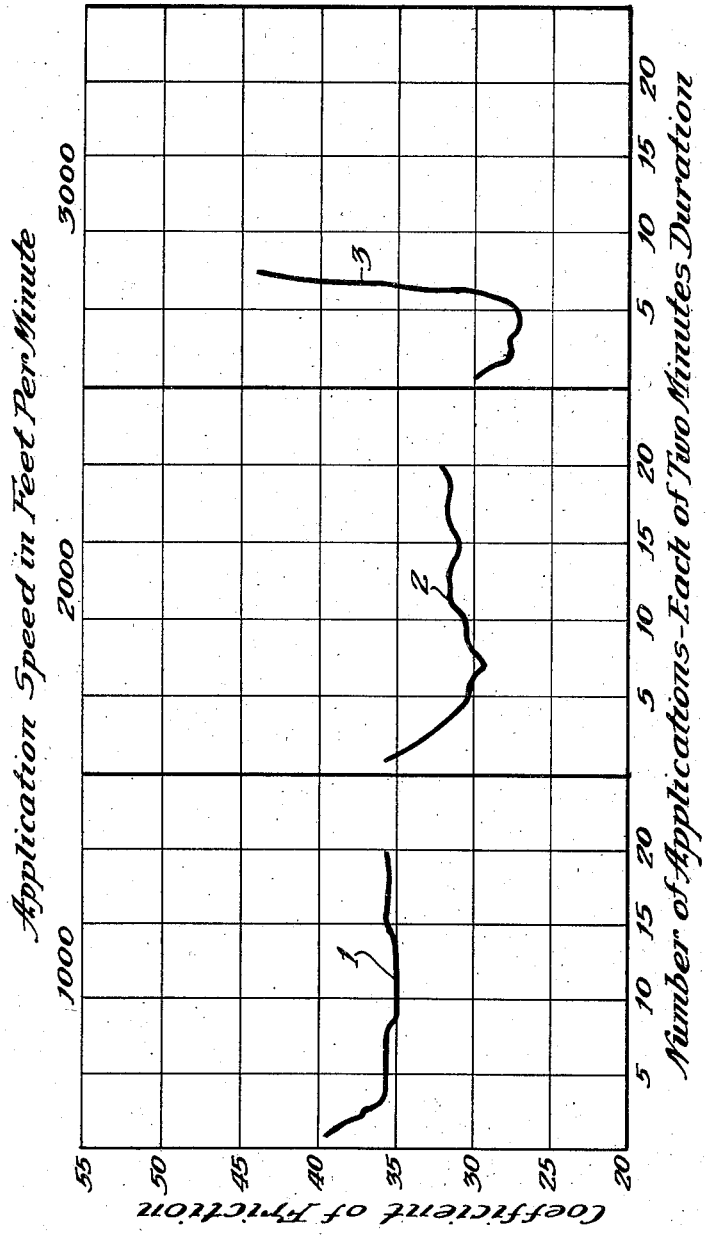

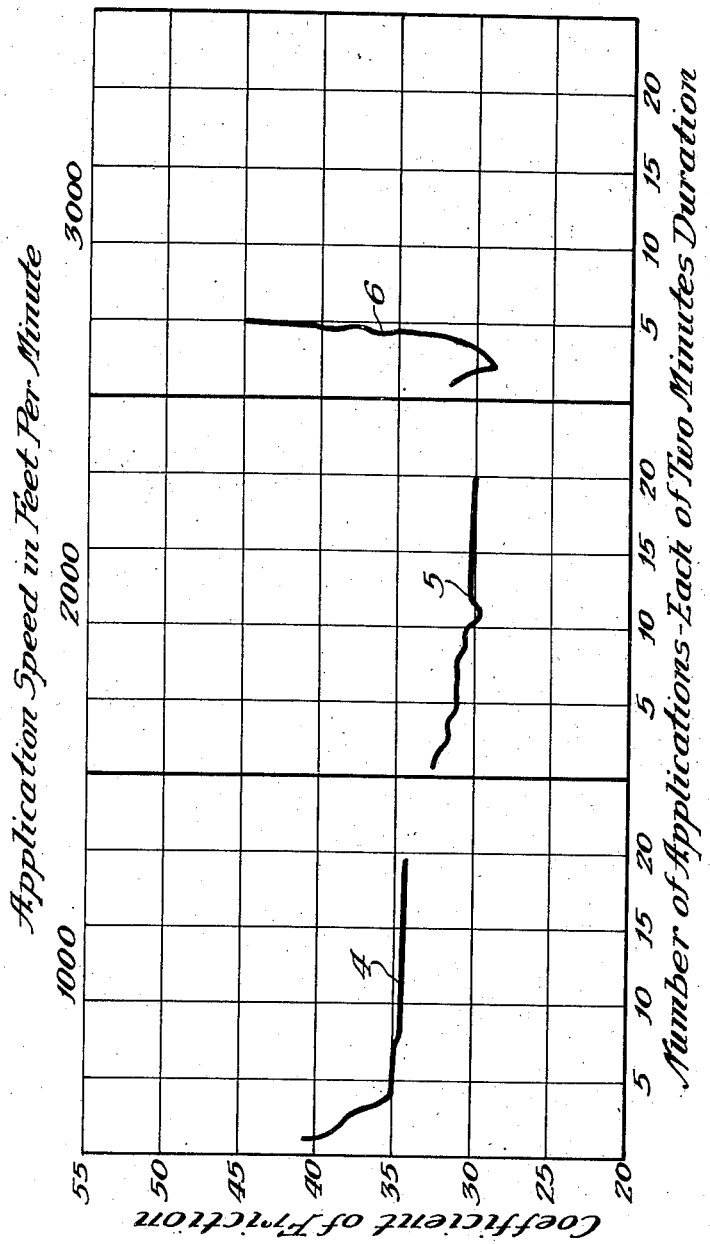

Nov. 9, 1948.  W. A. BLUME ET AL  2,453,188
METHOD OF MAKING FRICTION ELEMENTS AND BOND THEREFOR
Filed June 28, 1943  5 Sheets-Sheet 3
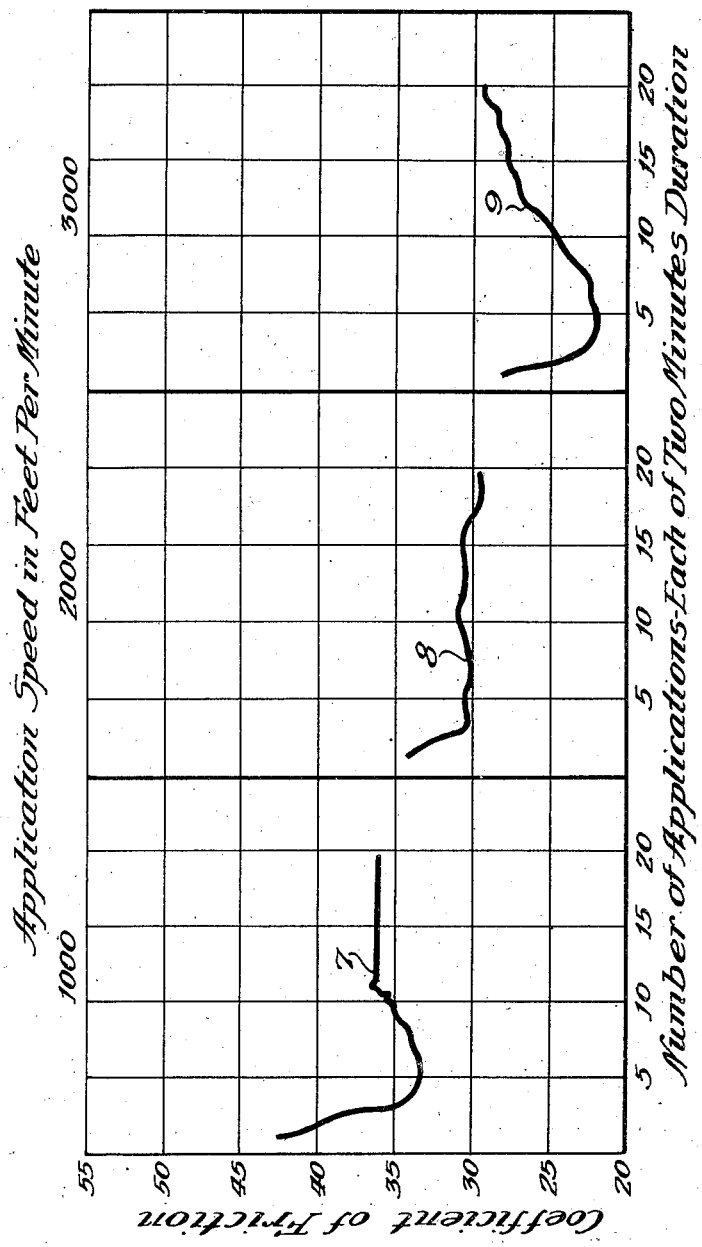
Inventors:
William A. Blume
Ray E. Spokes
By Wallace and Cannon
Attorneys

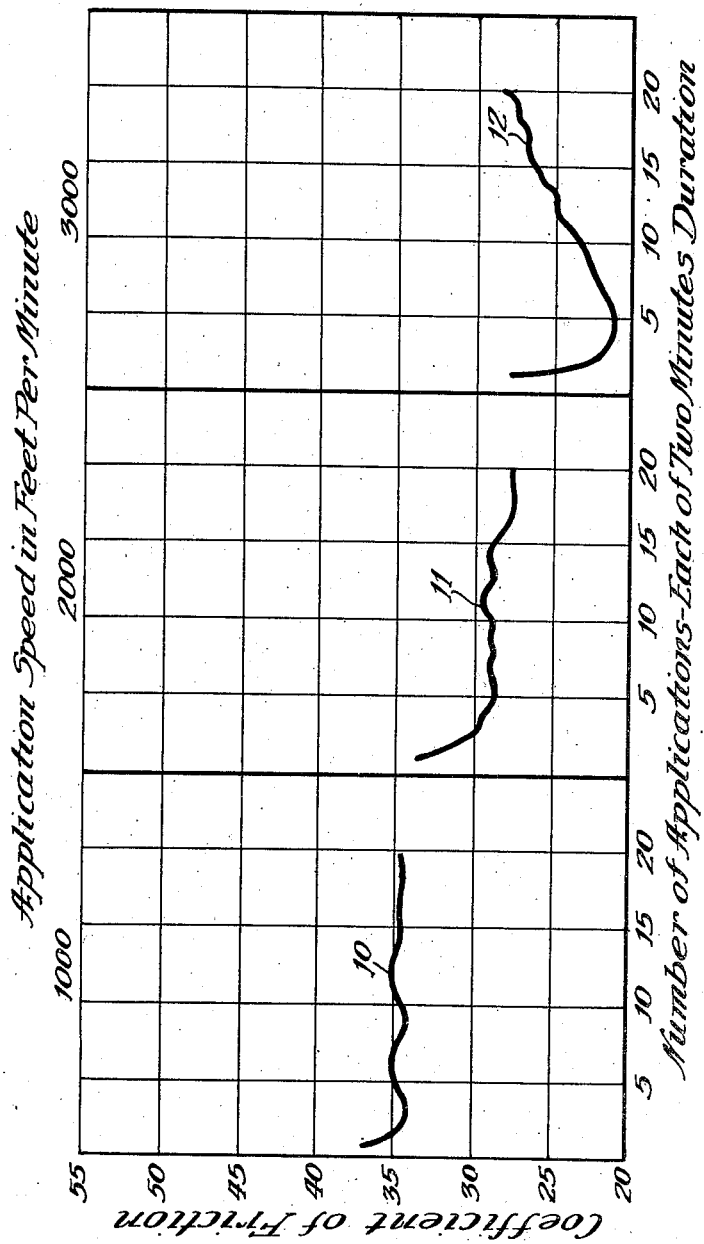

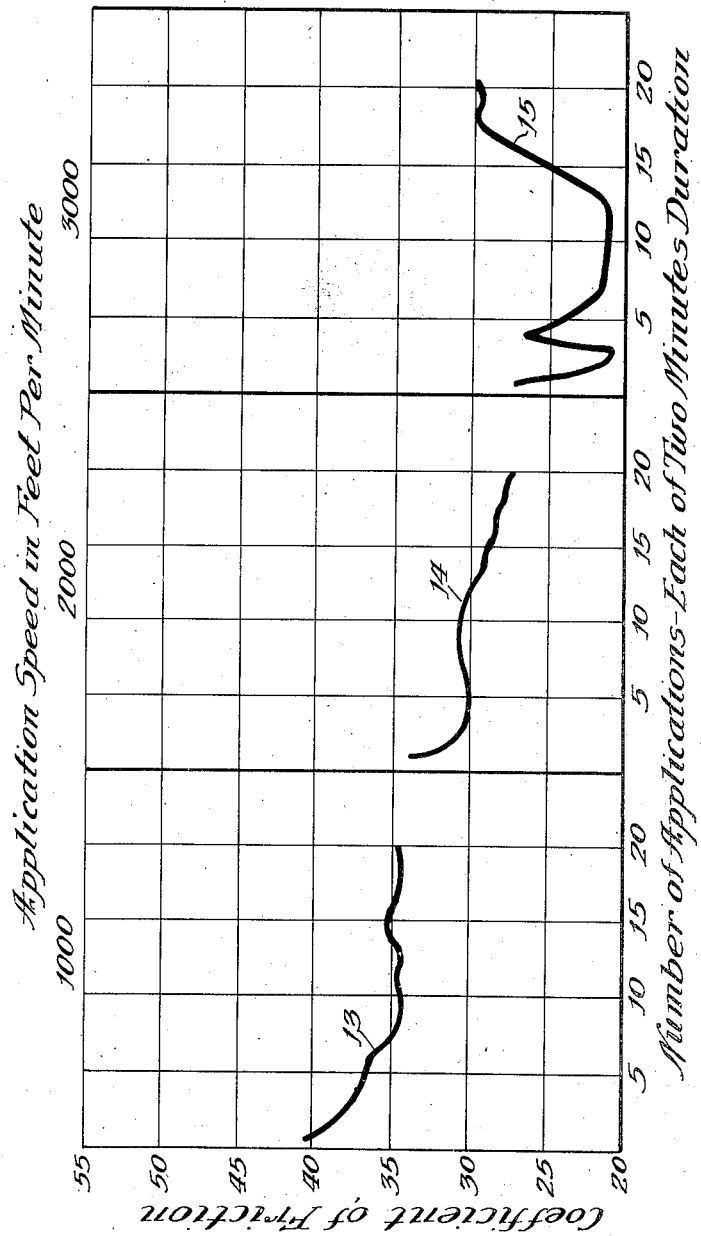

Patented Nov. 9, 1948

2,453,188

UNITED STATES PATENT OFFICE 2,453,188

METHOD OF MAKING FRICTION ELEMENTS AND BOND THEREFOR

William A. Blume, Farmington, and Ray E. Spokes, Ann Arbor, Mich., assignors to American Brake Shoe Company, New York, N. Y., a corporation of Delaware Application June 28, 1943, Serial No. 492,562

3 Claims. (Cl. 106—36)

This invention relates to friction elements such as are employed in the brakes and clutches of automotive vehicles, aircraft, machinery and the like and to the art of producing the same.

Friction elements of the character to which this invention pertains generally include friction material, such as asbestos, either in the form of woven tape or fabric, or in a somewhat loose or so-called felted form, and a bonding agent, which may be comprised of one or more vegetable drying oils or the like, and often other ingredients for controlling or imparting particular friction or other characteristics to the bond or to the resulting friction element.

Among the vegetable drying oils which have been employed heretofore as bonding agents in friction elements are tung or China-wood oil, linseed oil, perilla oil, and the like and also China-wood oil modified phenol-formaldehyde resins. Such oils are commonly pre-bodied, prior to use in or as bonding agents in friction elements, to impart desired body or viscosity thereto and the final bodying and hardening of the bonding oil is effected, at least in part, by heat after the friction material has been impregnated with the bonding oil. Such final bodying and hardening of the bond may be effected by heat polymerization and oxidation, in situ, or by heat and sulphurization, or by a combination of such methods, and it is with friction elements employing bonding agents which are cured primarily by sulphurization that the present invention is concerned.

The bodying of such vegetable drying oils has been effected in various ways as, for example, pre-bodying by partial hydrogenation of tung or China-wood oil, followed by final bodying by heat polymerization and oxidation, in situ, that is, after the friction material has been impregnated with the bonding oil, as in Seigle Patent No. 1,395,744, or pre-bodying of linseed oil by heat-polymerization to form a so-called purely (heat) polymerized oil, followed by final bodying by heat and sulphurization after the friction material has been impregnated with the purely polymerized linseed oil, with or without other ingredients. The present invention is primarily concerned with friction elements of the character in which the final bodying and hardening of the bonding oil is effected by heat and sulphurization, regardless of the method by which the pre-bodying of the bonding oil is effected because certain difficulties have been encountered heretofore in connection with the sulphurization of such partially bodied vegetable drying oils used in or as bonding agents in friction elements.

The customary method of incorporating sulphur into such pre-bodied vegetable drying oils has been by mechanically mixing the sulphur with the pre-bodied bonding oil prior to incorporating the thus formed sulphur-oil mixture with the friction material. However, this method has not been satisfactory for a number of reasons and among which are: (1) It is impossible to uniformly impregnate woven asbestos, that is, so-called woven asbestos tape or fabric, which is commonly employed as friction material in making friction elements, with a mechanical mixture of sulphur in partially bodied vegetable drying oil for the reason that the woven asbestos tape or fabric acts as a filter and filters the sulphur out of such sulphur-oil mixtures; (2) It is difficult to obtain a uniform dispersion of sulphur in a partially bodied vegetable drying oil by any known method of mechanically mixing the sulphur and oil with the result that it is impossible by such methods to obtain a uniform distribution of the sulphur throughout friction material impregnated with such a solvent thinned sulphur-oil mixture; and (3) It is impossible to subject woven asbestos tape or fabric, which usually contains about twenty percent (20%) by weight of cotton, to a temperature, and for a period of time, sufficient to heat polymerize a vegetable drying oil such, for example, as China-wood oil, with which such woven asbestos might be impregnated, since the temperature and heating time required to heat polymerize the oil would have a deleterious effect upon the asbestos-cotton woven fabric. Hence in the practice of the present invention the vegetable drying oil is heat polymerized, as far as is practicable, prior to the time the sulphur is dissolved therein and the sulphur-oil mixture is employed as a bonding agent in friction elements.

A further difficulty incidental to prior art attempts to impregnate woven asbestos tape or fabric with a mechanically mixed dispersion of sulphur in pre-bodied vegetable drying oil is that since it is impossible to impregnate such material with a mechanical bonding mixture of vegetable drying oil and sulphur only the external surface portions of the woven asbestos fabric are impregnated with such a bonding mixture and the internal mass or body remains unimpregnated so that such methods have not been successful.

Hence it will be seen that the bonding of friction elements employing woven asbestos or so-called asbestos tape or fabric as friction material has been limited to the use of those bodied vegetable drying oils, such as China-wood or tung oil, which cure primarily by polymerization, and other vegetable drying oils which cure primarily by oxidation, and to the use of other bonding agents such as asphaltic pitches and the like, which do not require sulphurization to effect the final curing or hardening thereof and the final hardening or curing of which is effected largely by heat polymerization and/or oxidation, in situ. It has not, therefore, been possible heretofore to employ with woven asbestos or so-called woven asbestos fabric or tape those bodied vegetable drying oils, such as so-called purely polymerized linseed oil, that is, heat polymerized linseed oil which is substantially free from oxidized oil, and the final curing or hardening of which is effected largely by heat and sulphurization.

Moreover, the use as bonding agents in friction elements of those vegetable drying oils, such as China-wood oil, the final curing or hardening of which is effected by heat polymerization and/or oxidation, in situ, is accompanied by certain difficulties and objectionable characteristics which are not experienced in the use of those vegetable drying oils the final hardening of which is effected largely by sulphurization. Among such difficulties are: (1) the temperatures and time required to complete the final hardening or bodying of such oils are such as to have a deleterious effect not only upon asbestos-cotton woven fabric but also upon the bonding oils themselves, frequently causing either complete breakdown in the oils or undesirable side reactions therein; and (2) by reason of the fact that the temperatures and heating times required to effect the final hardening or cure of such oils are such as to be impracticable the final curing and hardening of such oils is frequently incomplete and uneven or non-uniform and this is especially true of those portions or fractions of such oils which have penetrated inwardly of the external surface areas of friction materials impregnated with such oils.

In the practice of the present invention it is possible to impregnate woven asbestos tape or fabric, as well as loosely felted asbestos as, and like friction materials uniformly with the new partially bodied vegetable drying oil-sulphur solution of this invention, since the sulphur in such oil is not filtered out of the oil by the woven asbestos fabric, or loosely felted asbestos, due to the fact that the sulphur is dissolved in the oil and forms, at the impregnating temperature, a relatively thin free-flowing bonding oil solution which will pass through woven asbestos tape or fabric, as well as through loosely felted asbestos, and uniformly impregnate such friction materials with the new bonding oil-sulphur solution. Hence, it is possible to employ as bonding agents in friction elements embodying woven asbestos tape or fabric, as well as loose or so-called felted asbestos, those partially bodied vegetable drying oils such, for example, as the aforesaid so-called purely polymerized linseed oil, which cure largely by heat and sulphurization and which it has not been possible heretofore to employ as bonding agents in such friction elements.

An additional advantage of the present invention is that since it enables the use as bonding agents with woven asbestos fabric, and loosely felted asbestos, of those vegetable drying oils the final curing or hardening and bodying of which is effected by sulphurization, friction elements are thus afforded which are much more flexible than friction elements bonded with those vegetable drying oils, such as China-wood oil, the final curing of which is effected largely by heat polymerization and oxidation, in situ. Such bonding oils afford relatively stiff friction elements and by reason thereof it has been customary to employ pitches and other materials with such bonding oils in order to obtain the desired flexibility in the resulting friction elements.

Moreover, another important and advantageous feature of the present invention resides in the fact that since the dissolved sulphur in the new bonding oil-sulphur solution is initially in physical solution with the oil, but not chemically combined therewith, and combines chemically with the unsatisfied bonds of the oil during the final bodying or heat curing and hardening operation, there is relatively little loss of sulphur by volatilization or formation of volatile sulphur dioxide during the final bodying or heat curing and hardening operation.

Accordingly, an object of the present invention is to afford new and improved friction elements, embodying woven asbestos fabric or tape, or loosely felted asbestos, or similar friction material, and having the desirable properties, advantages and characteristics of friction elements made according to the present invention including those specifically pointed out herein and others which are inherent in the invention.

Another object of the present invention is to afford a new and improved method of making friction elements employing woven asbestos fabric or tape, or loosely felted asbestos, or the like, as friction material, together with a bonding agent comprising a partially bodied vegetable drying oil containing sulphur dissolved therein prior to impregnating the friction material with the bonding agent, thereby affording new and improved friction elements having the desirable properties and characteristics herein pointed out and others which are inherent in friction elements made according to the practice of the invention.

An additional object of the present invention is to enable the use as bonding agents in friction elements employing woven asbestos tape or fabric of those bodied vegetable drying oils such as the aforesaid so-called purely polymerized linseed oil the final curing or bodying and hardening of which is effected largely by heat and sulphurization and which it has not been possible to employ heretofore as bonding agents in friction elements employing woven asbestos fabric as friction material.

A further object of the present invention is to afford a new and improved method of sulphurizing bodied vegetable drying oils, including heat polymerized vegetable drying oils, such as linseed oil, which are to be used in or as bonding agents in friction elements.

An additional object of the present invention is to afford a friction element having advantages over, and desirable properties and characteristics not possessed by, comparable prior friction elements bonded with those vegetable drying oils, such as China-wood oil, the final curing or hardening of which is effected largely by oxidation and/or so-called heat polymerization, in situ, including improved friction and wear characteristics, and among which are greater friction stability and greater resistance to heat decomposition in use, greater flexibility, and more uniform cure of the bonding agent therein.

Still another object of the present invention is to afford a new and improved method of making friction elements and by which method there is obtained substantially uniform impregnation of the bonding oil-sulphur solution throughout the entire mass of friction material, such as woven asbestos tape or fabric or so-called felted or loose asbestos, with resulting substantial uniformity of sulphurization during the final heat curing or bodying and hardening of the bond in such friction elements.

We have found that the foregoing and other and related difficulties are overcome and improved friction elements are obtained by heating an intimate mixture of finely divided sulphur in and with solvent-thinned bodied vegetable drying oil, of suitable body or viscosity, to a temperature sufficient to dissolve the finely divided sulphur physically in the oil but not sufficiently high to cause the sulphur to combine chemically with the oil which would cause excessive bodying of the oil and would render it impossible to impregnate woven asbestos fabric with such a heavily bodied oil.

We have also found that when friction material, such as woven or felted asbestos, is impregnated with the thus formed vegetable drying oil-sulphur solution substantially uniform distribution or impregnation and cure of the sulphurized bonding oil throughout the entire mass or thickness of the friction material is obtained during the final heat curing operation, thereby overcoming a difficulty commonly experienced heretofore in the use of vegetable drying oils, such as tung or China-wood oil, which have been used heretofore to impregnate woven asbestos tape or fabric and which partially or completely oxidize during the heat-curing operation.

In the practice of the present invention, and in making the new friction elements, we may employ any partially bodied and sulphurizable vegetable drying oil, or a mixture of such oils, which has been bodied sufficiently or has a suitable viscosity to enable it to be employed in or as a bonding agent in friction elements. Thus, a typical example of such an oil is the aforesaid so-called purely (heat) polymerized linseed oil, of suitable viscosity, either alone or modified with other materials, such, for example, as an oil miscible resin of the phenolic-aldehyde type, an example of which is an oil modified "Bakelite" type resin, with or without other friction-controlling ingredients such, for example, as graphite, pitch or the like.

Thus we may, for example, employ the aforesaid so-called purely (heat) polymerized linseed oil, which is also known as purely polymerized but not otherwise changed linseed oil, of suitable viscosity, such an oil being one which has been subjected, concurrently with the heat-polymerizing operation, to a secondary or ancillary process for removing substantially all of the free fatty acid content as formed in the oil during and as a result of the heat-polymerizing operation as by having carbon dioxide or other inert gas passed through the oil during the heat-polymerizing operation.

If desired, however, we may also employ in the practice of the present invention a heat-polymerized vegetable drying oil such, for example, as linseed oil, of suitable viscosity, in which substantially all of the free fatty acid content formed in the oil during and as a result of the heat-polymerizing operation is retained therein rather than being removed therefrom, or we may employ a mixture of the aforesaid different types of heat-polymerized vegetable drying oils of suitable viscosity.

Another feature of the present invention is that by controlling the amount of sulphur employed in making the new vegetable drying oil-sulphur bonding solution we are enabled to use in preparing said bonding solution a heavily bodied sulphurizable vegetable drying oil which has been bodied by heat polymerization until it is highly viscous and tacky but is substantially free from gel formation and is completely soluble in petroleum thinner. The use of such a heavily bodied oil is particularly advantageous in making friction elements from woven asbestos fabric containing a substantial proportion of cotton since such oils, being initially highly bodied, require a relatively low temperature and a relatively short curing time to effect the final heat curing or bodying and hardening of the sulphurized bonding oil, thereby minimizing the deleterious effect of the heat-curing operation upon the cotton content, especially of the asbestos fabric, prior to final cure of the impregnant and resulting protection afforded the fibers by being so coated.

In the practice of the present invention, we preferably intimately mix finely divided sulphur and the selected bodied sulphurizable vegetable drying oil at atmospheric temperature and we then heat the mixture thus prepared to a temperature sufficiently high to melt the finely divided sulphur, and thus dissolve the sulphur physically in the oil, care being taken to avoid temperatures sufficiently high to cause the sulphur to combine chemically with the oil which would cause excessive bodying of the selected bonding oil and render it impossible to impregnate woven asbestos fabric or loosely felted asbestos therewith. Thus we have found that a temperature which is satisfactory for this purpose is a temperature of not substantially less than 120° C. and not substantially higher than 140° C., since within this rather critical range of temperatures the sulphur dissolves physically in the heat polymerized and bodied vegetable drying oil without combining chemically therewith.

Friction material such, for example, as woven or felted asbestos, with or without other friction-controlling ingredients or materials, is then thoroughly impregnated, in any suitable manner, with the thus formed vegetable drying oil-sulphur solution. In this manner there is obtained substantially uniform impregnation and distribution of the bonding oil-sulphur solution throughout the entire mass or thickness of the woven asbestos fabric, or loosely felted asbestos, or other fibrous, porous or like friction material, which may be used in making the new friction elements.

Another advantage of such uniform impregnation of the presulphurized bonding oil throughout the mass of asbestos is that after the final curing operation the sulphurized and hardened bonding oil not only binds the asbestos fibers together but affords a new and improved friction element having uniform frictional and wear characteristics throughout its useful life due, to a large extent, to the uniformity of the impregnant or binder both in distribution and composition.

Another advantage of the new method of making friction elements is that it enables the sulphurization of the selected sulphurizable vegetable drying oil employed as the bonding agent to be readily controlled since sufficient sulphur may be incorporated into the sulphur-oil bonding solution to assure complete sulphurization of the selected sulphurizable vegetable drying oil.

In this manner new and improved friction elements are obtained having the desirable advantages and characteristics hereinbefore referred to.

A typical example of a suitable formula and method which may be followed in making friction elements in the practice of the present invention, and employing woven asbestos tape or fabric as the loose friction material, is the following:

*Example*

433 pounds of the new sulphur-oil bonding solution were prepared by intimately mixing 72.2 pounds of finely divided sulphur in 361 pounds of the aforesaid purely heat-polymerized linseed oil from which substantially all of the free fatty acid content formed in the oil during and as a result of the heat-polymerizing operation was removed therefrom as formed as by having an inert gas such as carbon dioxide passed through the oil during the heat-polymerizing operation. The selected oil had an initial viscosity of approximately 800 poises, at atmospheric temperature, and was highly viscous and tacky but was substantially free of gel formation and was completely soluble in petroleum thinner. However, in the practice of the present invention the selected bonding oil is not dissolved in petroleum thinner or other solvent prior to or after mixture with the sulphur and reference herein to the solubility of the selected bonding oil in petroleum thinner is merely by way of describing one of the initial physical characteristics of such oils.

The sulphur-oil mixture thus prepared was thereupon heated at a substantially constant temperature of 135° C., while stirring, until all of the sulphur dissolved in the oil. The result was a relatively thin and free-flowing solution of sulphur in the bonding oil and which readily penetrates woven asbestos fabric or tape or like woven friction material.

The resulting sulphur-oil solution contained 16.7 percent of sulphur and 83.3 percent of oil of the total of sulphur and oil, by weight.

A strip of woven asbestos tape 3¼" wide and ⅜" thick and of a preselected length was heated to a temperature of 135° C. and was then immersed for a suitable length of time, namely, about six minutes, in the thus prepared and heated sulphur-oil solution while maintaining the sulphur-oil solution at a substantially constant temperature of 135° C., while stirring, and preferably pressing the woven asbestos fabric once or twice, during the immersion operation, to remove excess of the sulphur-oil bonding solution. The thus impregnated strip of woven asbestos tape was then removed from the sulphur-oil solution and then freed from excess oil and subjected to a pressure of from about 0.7 ton per square inch in order to remove entrapped or occluded air, and excess impregnant as well as for the purpose of controlling the thickness of the resulting friction elements. The resulting impregnated but uncured specimen showed a weight increase of 16.1 percent due to penetration of the sulphur-oil bonding solution into the woven asbestos fabric.

The specimen of impregnated woven asbestos tape was then subjected to gradually increasing temperatures to effect the final heat curing or hardening and bodying of the sulphurized bonding oil, namely, three hours at each of the following temperatures: 150° F., 175° F., 200° F., 225° F., 250° F., 275° F., 300° F., and 310° F., it being understood, of course, that the temperature and time required to effect the final bodying and hardening or heat curing of the thus sulphurized bonding oil will vary with the composition of the bond, the particular sulphurizable vegetable drying oil selected, and the initial viscosity thereof, and other variable factors.

The heating of the friction material before it is introduced into the sulphur-oil solution prevents sulphur from passing out of solution with the oil which would occur if the friction material were not thus pre-heated prior to its introduction into the oil, and it also removes entrapped or occluded air and moisture from the friction material and thus assists in securing a more uniform impregnation of the sulphur-oil solution throughout the mass or body of friction material.

The vegetable drying oil-sulphur bonding solution referred to in the foregoing illustrative example may be modified, if desired, with an oil miscible phenolic aldehyde type resin such, for example, as an oil modified "Bakelite" type resin.

It will be understood that while in the foregoing typical and illustrative example we have indicated the use of a preliminary pressure treatment of the impregnated friction material to remove occluded or entrapped air and excess of the sulphur-bonding oil impregnant, as well as for the purpose of controlling the thickness of the resulting friction elements, this preliminary pressure treatment is not indispensable in or to the practice of the present invention, and may, if desired, be eliminated entirely within the purview of the present invention.

In order to illustrate the improved properties and characteristics of friction elements made according to the practice of the present invention friction tests were run upon specimens of friction elements made according to the practice of the present invention and upon comparable specimens of prior art friction elements.

Figs. 1 to 4, inclusive, of the drawing are graphs, some of which illustrate the results of tests made upon specimens or friction elements made according to the practice of the present invention, and others of which illustrate the results of tests made upon comparable friction elements made according to prior art practices.

In the graphs shown in the drawings, the abscissae represent the results of friction tests stated in number of braking applications, each of two minutes duration, and at various application speeds, expressed in terms of feet per minute; and the ordinates represent the results of tests expressed in terms of the coefficients of friction of the friction elements tested.

The tests of which the results are graphically shown in Figs. 1 to 5, inclusive, were conducted on a special testing machine wherein specimens of friction elements compounded as aforesaid were successively secured in a holder and forced by controlled variable hydraulic pressure against the surface of a rotating drum embodied in the machine, the speed of the rotating drum being varied to simulate speeds of automotive vehicles upon the brakes of which such friction elements are used. The friction developed by the specimens is measured as force by hydraulically operated measure apparatus and the coefficients of friction are calculated therefrom.

It should be noted, in this regard, that in conducting tests, such as those to which the graphs pertain, on a special testing machine, there may be variations in readings taken at different times under identical test conditions, attributable, as is well understood, to the inherent characteristics of the entailed mechanical devices and other related circumstances. Thus, in considering the accompanying graphs, and the following discussion thereof, it should be remembered that each of these graphs illustrates the average of repeated tests and shows a trend toward a particular result rather than specific conditions which may be exactly duplicated time after time.

In order to eliminate variable factors, as far as possible, all of the bonding oils which were employed as bonding agents in the friction elements tested, and the results of which tests are shown graphically in Figs. 1 to 5, inclusive, had substantially the same viscosity under similar temperature conditions, and all of the bonding oils employed had been partially bodied before use until they were highly viscous and tacky but substantially free of gel formation while being substantially soluble in a suitable volatile solvent, such as petroleum thinner.

Thus, Fig. 1 is a group of three graphs which show the results of friction tests made upon a specimen of a friction element made according to prior art practice, and employing woven asbestos tape of the same character, width and thickness, as that employed in making those specimens of friction elements which were made according to the present invention, and to which reference will be made hereinafter.

In preparing the specimen, the results of which are shown in Fig. 1, raw tung or China-wood oil was employed as the bonding oil, and the woven asbestos tape or fabric impregnated with this bonding oil showed a weight increase of 17.5% after impregnation due to impregnation by the bonding oil. The specimen was subjected to a preliminary curing operation at a pressure of 0.7 ton per square inch and at a temperature of 250° F. for a period of twenty minutes, the final curing operation being conducted in an open oven so as to effect the final curing or bodying and hardening of the unsulphurized oil largely by oxidation according to prior art practice.

It will be noted, by reference to the graphs shown in Fig. 1, that the specimen of a friction element tested stood up fairly well under the first test at a braking or application speed of 1000 feet per minute, as indicated by graph 1 in Fig. 1, feet per minutes, as indicated by graph 1 in Fig. 1, and likewise withstood fairly well the second test at a braking or application speed of 2000 feet per minute, as indicated by graph 2 in Fig. 1. This is shown by the relatively uniform coefficient of friction throughout the tests, as shown in graphs 1 and 2 in Fig. 1. It will be noted, however, that this specimen disintegrated entirely during the third and more severe test involving a braking or application speed of 3000 feet per minute, as indicated by graph 3 in Fig. 1, and as shown by the practically vertical rise in the coefficient of friction in the friction element tested. This indicates a substantially complete break-down of the friction element resulting, in part, from non-uniform impregnation and cure of the bonding mixture throughout the friction material.

Fig. 2 is a group of three graphs which show the results of friction tests made upon a specimen of a friction element employing as friction material woven asbestos tape of the same character and thickness as that employed in making the specimen of a friction element the results of tests upon which are shown in Fig. 1. In this instance, however, the bonding agent employed was raw or unpolymerized linseed oil having finely divided sulphur mixed mechanically therewith at atmospheric temperatures to provide a mechanical mixture or dispersion of sulphur in the oil. The preliminary and final curing of the bonding oil was carried out under the same conditions of temperature, etc., as hereinbefore referred to in connection with the description of the graphs shown in Fig. 1 and the specimen of a friction element therein referred to. The percentage of sulphur in the mechanical sulphur-oil mixture was 16.7 percent of the total weight of the sulphur-oil mixture and the increase in weight of the friction material after impregnation was 17.4 percent due primarily to the impregnation of the oil itself rather than of the sulphur mechanically mixed therein.

It will be noted from Fig. 2 that the friction element tested withstood fairly well the first test at an application or braking speed of 1000 feet per minute, as indicated in graph 4, and also withstood quite well the second test at an application speed of 2000 feet per minute, as shown by graph 5 in Fig. 2. It will be noted, however, that, like the friction element referred to in Fig. 1, the specimen referred to in Fig. 2 disintegrated completely at the more severe test involving an application speed of 3000 feet per minute, as shown by graph 6 in Fig. 2. This is indicated by the substantially vertical rise of graph 6, and the coefficient of friction represented thereby, and which is due, in part, to lack of uniform impregnation and cure of the mechanical mixture of sulphur oil employed as the bonding agent.

Fig. 3 is a group of graphs which show the results of tests made upon a specimen of a friction element employing woven asbestos tape as friction material and employing as the bonding agent a solution of sulphur in the aforesaid so-called purely polymerized linseed oil, that is to say, heat-polymerized linseed oil from which substantially all of the free fatty acid content formed in the oil during the heat-polymerizing operation was removed therefrom, as formed, thereby providing a partially bodied heat-polymerized linseed oil having a relatively low acid number and substantially free of oxidized oil.

The sulphur-oil bonding solution employed was made according to the practice of the present invention and contained 16.7 percent sulphur and 83.3 percent of oil relative to the total weight of the sulphur-oil mixture and after impregnation the woven asbestos-cotton fabric showed a weight increase of 15.6 percent due to impregnation with the sulphur-oil bonding solution.

The preliminary and final curings of the impregnated friction material were made under the same conditions hereinbefore set forth in connection with the description of the graphs shown in Fig. 1 and the specimen of a friction element therein referred to.

As shown in Fig. 3, the specimen of a friction element made in accordance with the practice of the present invention, and which is therein referred to, withstood not only the less severe tests made at application speeds of 1000 feet per minute (graph 7) and 2000 feet per minute (graph 8) but also satisfactorily resisted the more severe test conducted at an application speed of 3000 feet per minute, as shown by the relatively small vertical rise in graph 9 in Fig. 3 and the correspondingly relatively small increase in coefficient of friction of the friction element tested. Thus, the superior characteristics of the new friction elements over comparable prior art friction elements may be seen by comparing graph 9 in Fig. 3 with graphs 3 and 6 in Figs. 1 and 2, respectively.

Fig. 4 is a group of graphs also showing the results of tests made upon a specimen of a friction element made in accordance with the practice of the present invention. In this instance the sulphur-bonding oil solution employed was the same as that employed in maknig the tests the results of which are shown in Fig. 3 and the woven asbestos fabric showed the same percentage of increase in weight after impregnation. The preliminary and final curings of the bond were conducted under the same conditions as hereinbefore referred to in connection with the description of the graphs shown in Fig. 1.

As shown by graph 10 in Fig. 4, the specimen tested withstood not only the less severe tests conducted at an application speed of 1000 feet per minute, and also the somewhat more severe tests conducted at an application speed of 2000 feet per minute, as shown by graph 11 in Fig. 4, but also satisfactorily withstood the severe test conducted at an application speed of 3000 feet per minute, as shown by graph 12 in Fig. 4, and which is comparable to and of the same order as graph 9 in Fig. 3.

Fig. 5 is a group of graphs showing the results of tests made upon a third specimen of a friction element made in accordance with the practice of the present invention, and embodying substantially the same composition as the specimens to which the graphs shown in Figs. 3 and 4 relate and under the same conditions set forth in connection with the description of the graphs shown in Fig. 1 and the friction element to which said graphs relate. In this instance, however, the increase in weight of the woven asbestos tape due to impregnation with the sulphur-oil bonding solution was slightly less than the increase in weight of the friction element specimens to which the graphs shown in Figs. 3 and 4 relate, having been 16.1 percent, by weight.

It will be seen from the foregoing description, and from the graphs shown in the accompanying drawings, that the present invention, including the new method of making friction elements, and friction elements made in accordance therewith, have the desirable characteristics, properties and advantages, and accomplish their intended objects, including those which have been pointed out hereinbefore and others which are inherent in the practice of the present invention.

While we have described selected embodiments of our invention, and a preferred method of practicing the same, it is to be understood, that these are capable of variation and modification and we, therefore, do not wish to be limited to the precise details set forth but desire to avail ourselves of such changes and alterations as fall within the purview of the following claims.

We claim:

1. A method of making friction elements of the type which include as initial components thereof pre-formed asbestos fiber web, as friction material, and a bonding agent comprised of sulphur and partially bodied sulphurizable purely heat-polymerized linseed oil, that is, heat-polymerized linseed oil which is substantially free of oxidized oil, and which has been heat-polymerized prior to being mixed with the sulphur until it is highly viscous and tacky but is substantially free from gel formation and is completely soluble in petroleum thinner, which comprises intimately mixing the finely divided sulphur and the partially bodied purely heat-polymerized linseed oil in quantities sufficient to provide a bond for the pre-formed asbestos fiber web friction material and in quantities relative to each other sufficient to effect subsequent substantially complete cure of the said partially bodied purely heat-polymerized linseed oil by sulphurization, dissolving the sulphur in the partially bodied purely heat-polymerized linseed oil by maintaining the said sulphur-oil mixture at a temperature of not substantially less than 120° C. nor substantially more than 140° C. for a period of time sufficient to completely dissolve the sulphur in the said partially bodied purely heat-polymerized linseed oil but insufficient to cause any substantial reaction between the sulphur and the said partially bodied purely heat-polymerized linseed oil, impregnating the said pre-formed asbestos fiber web friction material with the thus formed sulphur-oil bonding solution, and then heating the thus impregnated preformed asbestos fiber web friction material at a temperature and for a period of time sufficient to completely solidify the bond by sulphurization in situ.

2. A bonding agent for friction elements which is comprised of a solution formed by intimately mixing finely divided sulphur and partially bodied purely heat-polymerized linseed oil, that is, heat-polymerized linseed oil which is substantially free of oxidized oil and which has been heat-polymerized, prior to being mixed with the sulphur, until it is highly viscous and tacky but is substantially free of gel formation and is completely soluble in petroleum thinner, and heating the sulphur-oil mixture thus formed at a temperature of not substantially less than 120° C. nor substantially more than 140° C., for a period of time sufficient to completely dissolve the sulphur in the oil but insufficient to cause any substantial reaction therewith.

3. The method of forming a bonding agent for friction elements which comprises intimately mixing finely divided sulphur and partially bodied purely heat-polymerized linseed oil, that is, heat-polymerized linseed oil which is substantially free of oxidized oil and which has been heat-polymerized, prior to being mixed with the sulphur, until it is highly viscous and tacky but is substantially free from gel formation and is completely soluble in petroleum thinner, in quantities sufficient relative to each other to provide a bonding agent for friction elements, and then dissolving the said sulphur in the said partially bodied purely heat-polymerized linseed oil by maintaining the said sulphur-oil mixture at a temperature of not substantially less than 120° C. or substantially more than 140° C. for a period of time sufficient to completely dissolve the sulphur in the said partially bodied purely heat-polymerized linseed oil but insufficient to cause any substantial reaction between the sulphur and the said partially bodied purely heat-polymerized linseed oil.

WILLIAM A. BLUME.
RAY E. SPOKES.

REFERENCES CITED

The following references are of record in the file of this patent:

UNITED STATES PATENTS

| Number | Name | Date |
| --- | --- | --- |
| 39,139 | Fuller | July 7, 1863 |
| 323,128 | Egleston | July 28, 1885 |
| 639,087 | Newman | Dec. 12, 1899 |
| 1,053,299 | Knowles | Feb. 18, 1913 |
| 1,628,370 | Nelsen | May 10, 1927 |
| 1,959,686 | Nanfeldt | May 22, 1934 |
| 1,976,807 | Schaeffer | Oct. 16, 1934 |
| 2,129,794 | Spokes | Sept. 13, 1938 |
| Re. 20,908 | Blume | Nov. 1, 1938 |
| 2,175,480 | Nanfeldt | Oct. 10, 1939 |
| 2,273,770 | Nanfeldt | Feb. 17, 1942 |

FOREIGN PATENTS

| Number | Country | Date |
| --- | --- | --- |
| 361,025 | Great Britain | 1931 |